(No Model.)
B. WILLIAMS.
FLUSHING BASINS.
No. 252,344. Patented Jan. 17, 1882.
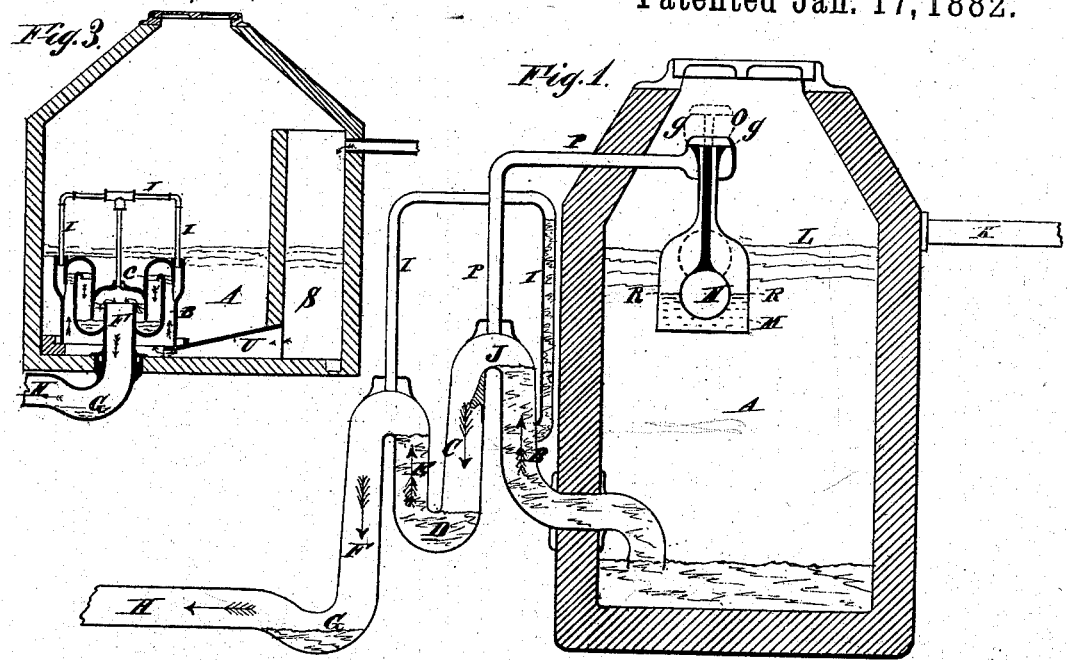
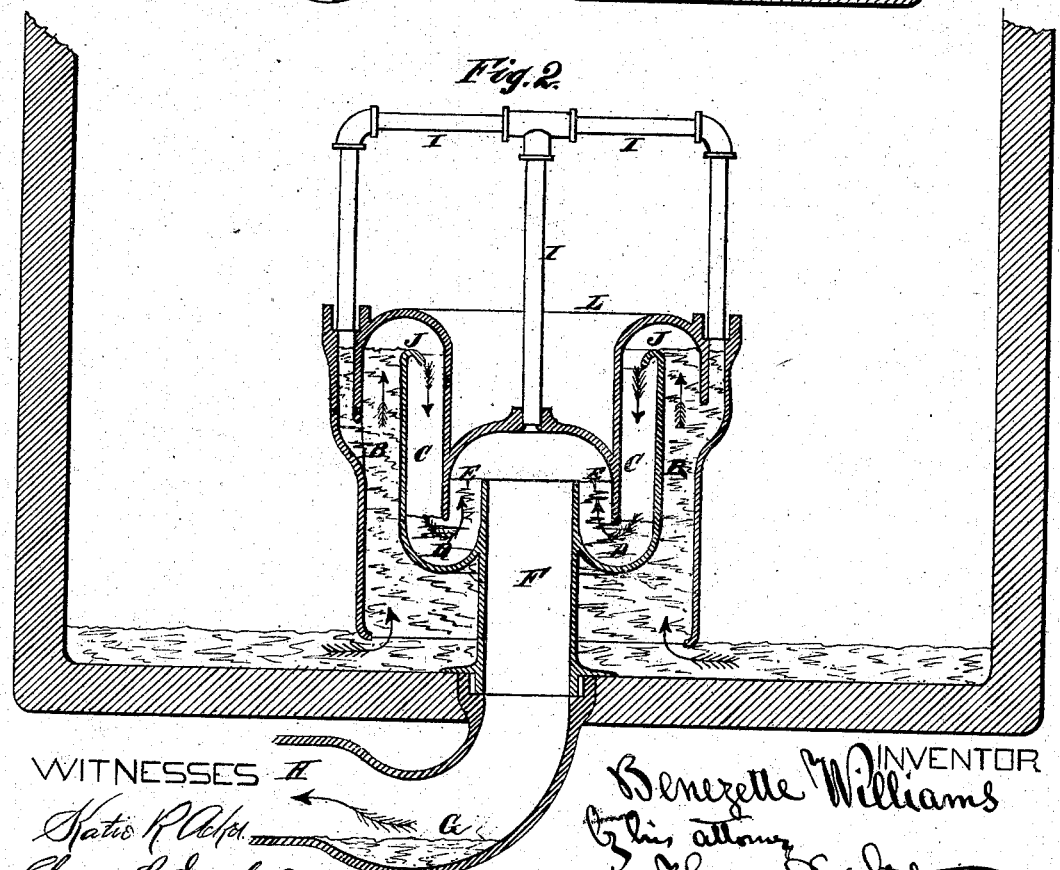
WITNESSES
Katie R. Alsp.
Charles R. Searle.
INVENTOR
Benezette Williams
By his attorney
Thomas D. Stetson.

UNITED STATES PATENT OFFICE.

BENEZETTE WILLIAMS, OF CHICAGO, ILLINOIS.

FLUSHING-BASIN.

SPECIFICATION forming part of Letters Patent No. 252,344, dated January 17, 1882.

Application filed March 26, 1881. (No model.)

*To all whom it may concern:*

Be it known that I, BENEZETTE WILLIAMS, a citizen of the United States, residing in Chicago, county of Cook, State of Illinois, have invented a certain new and useful Improvement in Flushing-Basins, of which the following is a full and exact description.

I employ a combination of siphons attached to a reservoir into which a liquid is received, and so construct and arrange the apparatus as to furnish a strong automatic discharge therefrom at intervals, forming an intermittent flushing apparatus that can be attached to a sewer or drain for the purpose of preventing deposits therein.

I have also invented a combination of the flushing apparatus with a house-basin in a system of house-drainage, by means of which it is converted into a flushing-basin for the removal of grease and kindred substances without injury to the drains or sewers.

Reference is had to the drawings forming part of this specification. All are central vertical sections.

Figure 1 represents my invention applied to the side of a basin or reservoir. Fig. 2 represents the invention in an annular form that connects with and discharges from the bottom of the reservoir within which it is inclosed. Fig. 3 represents the same in combination with a house-basin.

The same letters in the figures indicate corresponding parts.

A is the basin, tank, or reservoir, from which a liquid is to be discharged intermittently.

B is the main ascending leg or channel of the first siphon.

C is a descending leg of the first siphon, which terminates in a trap, D.

E is an ascending leg of the second siphon, connecting with and forming part of the trap D.

F is the main descending leg of the same siphon, terminating in the partial trap G, which connects with the pipe or drain H.

I is a channel or passage connecting the top of the second siphon with the ascending leg B of the first siphon, and carried to a height greater than either.

J is the crest or point of overflow of the first siphon, with a lip or projection so made that a liquid will fall clear of the sides of the siphon into the trap D below.

K is a pipe from which the liquid is received or delivered into the reservoir A.

The action of the apparatus so far as yet described is as follows: The liquid runs into the basin through the pipe K and gradually fills it, at the same time rising in the leg B until it has passed the point where the channel I connects with the leg B. If, now, the trap D be full of liquid, the air in the upper part of the legs B and C will be compressed by the ascending liquid, which will in turn push the liquid down in the leg C and out through the trap D and the leg E until it stands even with the turn of the trap D and with the overflow between the legs E and F. By this time the liquid will have risen in the basin to the height L, which is as much above the overflow J as the surface of the liquid in E is above the surface in the leg C. If, now, liquid continues running into the basin, even in small quantities, it will overflow the crest J, and in falling through the air in the intermediate leg, C, will gradually carry it out through the trap D and cause the liquid to rush over and the siphon to run full with a velocity due to the distance between the surface of the liquid in the basin A, and the overflow between the legs E and F. The quantity of liquid thus discharged will fill the pipe H, so as to seal the partial trap G, when the liquid falling through the leg F will exhaust it of air, thus causing the siphon to discharge with a velocity due to the head between the surface of the liquid in the reservoir A and the pipe or drain H. The discharge through the siphon will continue with a velocity due to the decreasing head until the liquid in the reservoir is drawn down to the lower end of the ascending leg B, when the admission of a small quantity of air into the leg B checks the discharge to such a degree that the partial trap G is unsealed, and the air passes up through the descending leg F, and thence through the channel or passage I, past the trap D, letting the liquid out of the leg B. The flow of the liquid through the siphon is thus stopped, and no further discharge will occur until the basin again fills to the line L. A small quantity of liquid is sufficient to start the flow through the first siphon if a sufficient time is given, but the quantity must not be too small compared with the size of the siphon.

In case it is desired to have the siphon very large compared with the quantity of flowing liquid, or if it is desirable to secure an instantaneous discharge, it is done by means of the relief-valve shown in Fig. 1.

M is a bell-shaped chamber attached to the reservoir A, and open at the bottom, in which there is a float, N, connected by a rod with the valve O.

P is a pipe or channel connecting the ports $g$ with the top J of the first siphon. The valve O, when resting on its seat, closes the ports $g$ and prevents the escape of air from or its admission to the siphon. It also closes a port at the top of the chamber M and prevents the escape of air therefrom. The valve bears upon its seat with its own weight and the weight of the float N when no liquid is touching the float. The float is placed somewhat above the top of the first siphon and at such a point in the chamber M that before the rising liquid and the pressure of the air on the under side of the valve will raise it from the seat the liquid will have attained a height, L, in the basin and a less height, R, within the chamber M, the air in the chamber being compressed to an amount due to distance between R and L. At the instant that the valve O is lifted from its seat the air in the chamber M is relieved, and the float and valve are lifted to the position shown by the dotted lines, at the same time the pressure in the leg C of the siphon is relieved, and the liquid flows readily through the siphon. As soon as the surface of the liquid is drawn down sufficiently the valve O closes and leaves the siphon free to discharge and rid itself of liquid, as before described. This process will be repeated as often as the basin or reservoir is filled with the liquid, instantaneous discharge being secured, however small the stream of liquid flowing into the basin or however large the siphon and basin.

Fig. 3 shows my invention as a combined flushing and house-drain basin—that is, a basin into which sewage flows from a system of house-drains. Such basins as ordinarily constructed are known as "catch-basins" or "grease-traps." The purpose for which they are used is to separate the grease and kindred matter from the other portions of the sewage. If not prevented from entering the sewer, the grease is liable to adhere to the sides of the same and gradually clog it. Basins of this description require a periodical removal of the grease, and when neglected often stop the drain and become a nuisance otherwise. Grease, on becoming cold and coagulation occurring, can be carried off by a rapid current of sewage without danger of its adhering to the sides of the sewer. A contrivance which will accomplish this will do away with the necessity of a periodical removal of grease from the basin. It will also remove the danger arising from neglect, and will convert the house-drain basin into a flushing-basin to the benefit of the sewer. All these purposes I accomplish by the combination shown in Fig. 3, in which S represents a chamber partitioned off from the basin or reservoir A, but which communicates therewith through the medium of the opening T in the bottom of the reservoir.

U is a channel or passage for sewage, with a sloping top connecting the grease-chamber S with the automatic siphon, the channel being the only inlet to the siphon.

The operation of the apparatus is as follows: Sewage flows into the chamber S from the house-drain K and fills the chamber S; at the same time filling the reservoir A through the opening T. The grease floating on the surface of the liquid sewage cannot enter the reservoir A, since the opening T is submerged at all stages of the sewage. When the sewage reaches the height L the discharge of the same through the siphon begins in the manner heretofore described, and as soon as it is drawn down below the upper part of the entrance of the channel U the floating grease is carried along with the current of the flowing sewage into the channel U through the siphon and into the sewer H. During this process the sewage from the reservoir A enters the grease-chamber S through the opening T at the farther side of the side of the chamber from the entrance to the channel U, where, in boiling up from the bottom, it aids in floating the grease into the channel.

I attach much importance to the provision by means of the overhanging lip J for causing the flow of the siphon to project the water through the more or less rarefied air within the siphon with the effect to entangle more or less of such air in the form of minute bubbles, and cause them to be carried away by the stream of water passing through the siphon. It resists the tendency, which is more or less observable in all siphons, to accumulate air in the bend. It introduces a mode of operation which tends to distribute any air thus accumulated.

Modifications may be made in the forms and proportions of the details. I can use a slide-valve working with a gentle pressure on its seat in place of the puppet-valve O. I can attach a float, N, and chamber M to the form of the device shown in Fig. 2.

Parts of the invention may be used without the others.

Some of the advantages of the invention will be attained by the use of the other parts without the float N and its attachments. The float when used may be used with some success without the air chamber M. I prefer the whole, as shown.

Instead of using the siphon made in an annular form, one connecting with the side of the basin, as shown in Fig. 2, can be used. The chamber S and the channel U may take a great variety of positions and shapes, though the purpose of this part of my invention is accomplished when, with a house-basin, a second chamber or reservoir is employed to catch grease and a channel with a sloping top is used to convey the sewage and grease to an automatic siphon, by means of which they are intermittently discharged with a strong flow into the sewer.

I claim as my invention—

1. The partial trap G, in combination with the reservoir A and drain H, and with two siphons, B C and E F, and with a complete trap, D, arranged to operate as herein specified.

2. The lip or projection J, arranged as shown, in combination with the first siphon, B C, the second siphon, E F, and with a complete trap, D, partial trap G, reservoir A, and drain H, as herein specified.

3. The air pipe or passage I, connecting the top of one siphon, E F, with the ascending leg B of the other siphon, and carried higher than either, so as to serve for arresting the flow of the water, but admitting air past the trap D into the leg B, and thereby stopping the discharge of the siphon, substantially as herein specified.

4. The chamber M, float N, valve O, ports g, and air-passage P, in combination with the siphon B C and the reservoir A, arranged to serve as herein specified.

5. The pipe K, reservoir A, compound siphons formed of B C and E F, trap D, partial trap G, drain H, air-passage I, chamber M, float N, valve O, ports g, and the air-passage P, combined and arranged as herein specified.

6. In a house-drainage system, the channel U, having the inclined upper surface, as shown, in combination with the grease-chamber S, the house-basin A, and low connecting-opening, T, arranged to serve as herein specified.

7. In a house-drainage system, the pipe K, the reservoir A, the chamber S, the opening T, the chamber U, the compound siphons formed of B C and E F, the trap D, the partial trap G, the sewer H, the lip J, and the air-passage I, combined to form a house-basin and sewer-flushing apparatus, in which the grease of the sewage is held until it is cold, and is carried off with a strong flow of the sewage, as herein specified.

In testimony whereof I have hereunto set my hand at Chicago, Illinois, this 14th day of March, 1881, in the presence of two subscribing witnesses.

BENEZETTE WILLIAMS.

Witnesses:
  F. A. JOHNSON,
  THOMAS S. McCLELLAND.